US012594812B2

(12) United States Patent
Mayer et al.

(10) Patent No.: US 12,594,812 B2
(45) Date of Patent: Apr. 7, 2026

(54) HOUSING ASSEMBLY FOR AN HVAC SYSTEM

(71) Applicant: VALEO SYSTEMES THERMIQUES, La Verriere (FR)

(72) Inventors: Tim Mayer, Auburn Hills, MI (US); Chad Ebling, Auburn Hills, MI (US); Anthony Tundo, Auburn Hills, MI (US)

(73) Assignee: Valeo Systemes Thermiques, Bobigny (FR)

( * ) Notice: Subject to any disclaimer, the term of this patent is extended or adjusted under 35 U.S.C. 154(b) by 280 days.

(21) Appl. No.: 18/319,604

(22) Filed: May 18, 2023

(65) Prior Publication Data

US 2024/0383309 A1 Nov. 21, 2024

(51) Int. Cl.
B60H 1/00 (2006.01)
B60H 3/06 (2006.01)

(52) U.S. Cl.
CPC ..... B60H 1/00514 (2013.01); B60H 1/00521 (2013.01); B60H 1/00564 (2013.01); B60H 1/00585 (2013.01); B60H 2003/065 (2013.01)

(58) Field of Classification Search
CPC ............ B60H 1/00514; B60H 1/00521; B60H 1/00564; B60H 1/00528; B60H 2003/065
See application file for complete search history.

(56) References Cited

FOREIGN PATENT DOCUMENTS

| | | | |
|---|---|---|---|
| DE | 102012012669 A1 | 1/2013 | |
| EP | 2634023 B1 | 8/2017 | |
| FR | 2751921 A1 * | 2/1998 | ............... B60H 3/06 |
| FR | 2775635 A1 | 9/1999 | |

OTHER PUBLICATIONS

European Patent Office, International Search Report and Written Opinion of corresponding PCT Application No. PCT/US2024/028344, dated Aug. 26, 2024.

* cited by examiner

*Primary Examiner* — Allen R. B. Schult
(74) *Attorney, Agent, or Firm* — Valeo Systemes Thermiques

(57) ABSTRACT

A housing assembly for an HVAC system, including: a casing with an air inlet and an air outlet, forming a first portion of an air conduit between the air inlet and the air outlet, the air conduit being configured to guide airflow between the air inlet and the air outlet; a removable cover, attached to the casing and forming a second portion of the air conduit. The casing and the removable cover form a filter slot with a filter volume, configured to receive a filter of complementary shape, the filter slot including four sidewalls for constraining the filter, an inlet aperture and an outlet aperture for allowing the airflow between the air inlet and the air outlet. The air conduit includes a guidance wall neighboring at least one of the filter slot sidewalls, the second portion of the air conduit including a part of the guidance wall.

19 Claims, 8 Drawing Sheets

HOUSING ASSEMBLY FOR AN HVAC SYSTEM

TECHNICAL FIELD

Invention relates to a housing assembly for an HVAC system, in particular to a housing with an air conduit in which a filter can be placed, for example applicable to the automotive field.

BACKGROUND OF THE INVENTION

HVAC (heating, ventilation and air conditioning) systems utilize air conduits for managing the airflow. Some HVAC systems incorporate filters, which are placed within the airflow in order to remove particles from the air. After a period of use, the system may require filter replacement. For this reason, an old filter will be removed from the air conduit and a new filter will be installed in its place. Such filter can be placed in a housing assembly, for example upstream or downstream a blower device of the HVAC system. In any case, HVAC system usually is designed to utilize available space to a maximum extent. This may lead to challenging packaging constrains, including for remaining components of the HVAC system such as heat exchangers.

It would be desirable to provide a housing assembly for an HVAC system adapted to facilitate any maintenance activities that can be required during HVAC system lifetime.

SUMMARY OF THE INVENTION

The object of the invention is, among others, a housing assembly for an HVAC system, comprising: a casing with an air inlet and an air outlet, forming a first portion of an air conduit between the air inlet and the air outlet, the air conduit being configured to guide airflow between the air inlet and the air outlet; a removable cover, attached to the casing and forming a second portion of the air conduit; wherein the casing and the removable cover form a filter slot with a cuboid filter volume, configured to receive a generally cuboid filter of complementary shape for filtrating the air traversing the air conduit, the filter slot including four sidewalls for constraining the filter, an inlet aperture and an outlet aperture for allowing the airflow between the air inlet and the air outlet, wherein the air conduit includes a guidance wall neighboring at least one of the filter slot sidewalls, the second portion of the air conduit including a part of the guidance wall.

In one embodiment, the air conduit includes a pre-filter section defined between the air inlet and the filter slot and a post-filter section defined between the filter slot and the air outlet, wherein the guidance wall is part of the pre-filter section.

In one embodiment, the part of the guidance wall included in the second portion has an oblique section extending towards and terminating in an oblique manner in a sidewall of the filter slot.

In one embodiment, the part of the guidance wall included in the second portion has a parallel section extending towards and terminating in parallel manner in a sidewall of the filter slot.

In one embodiment, the air conduit includes a pre-filter section defined between the air inlet and the filter slot and a post-filter section defined between the filter slot and the air outlet, wherein the guidance wall is part of the post-filter section.

In one embodiment, the part of the guidance wall included in the second portion forms a corner section terminating in two adjacent sidewalls of the filter slot.

In one embodiment, the second portion of the air conduit includes one full sidewall of the filter slot and a portion of another, adjacent sidewall of the filter slot.

In one embodiment, the part of the guidance wall included in the second portion forms a side section terminating in a single sidewall of the filter slot.

In one embodiment, the housing assembly further includes a cuboid filter placed in the filter slot.

In one embodiment, the second portion of the air conduit is connected with the first portion of the air conduit, wherein one of the first and second portions includes a groove for receiving the other from the first and second portions.

In one embodiment, the second portion of the air conduit is connected with the first portion of the air conduit, wherein the second portion of the air conduit includes the groove for receiving the first portion of the air conduit.

In one embodiment, second portion of the air conduit is adapted to be slid with respect to the first portion of the air conduit along a sidewall of the filter slot.

Another aspect of the invention is an HVAC system, comprising a housing assembly including: a casing with an air inlet and an air outlet, forming a first portion of an air conduit between the air inlet and the air outlet, the air conduit being configured to guide airflow between the air inlet and the air outlet; a removable cover, attached to the casing at a removable cover location and forming a second portion of the air conduit; wherein the casing and the removable cover form a filter slot with a cuboid filter volume, configured to receive a generally cuboid filter of complementary shape for filtrating the air traversing the air conduit, the filter slot including four sidewalls for constraining the filter, an inlet aperture and an outlet aperture for allowing the airflow between the air inlet and the air outlet, wherein the air conduit includes a guidance wall neighboring at least one of the filter slot sidewalls, the second portion of the air conduit including a part of the guidance wall; a heat exchanger removable from the HVAC system; wherein the housing assembly is configured to enable movement of the heat exchanger towards removable cover location during the heat exchanger removal.

In one embodiment, the housing assembly is dimensioned to enable removal of the heat exchanger when the removable cover is removed and prevent removal of the heat exchanger when the removable cover is in place.

In one embodiment, the housing assembly includes a servicing opening for the heat exchanger, wherein the housing assembly forms a servicing space between the servicing opening and the filter slot, the heat exchanger and the removable cover being able to move into the servicing space upon detachment from the housing assembly.

BRIEF DESCRIPTION OF DRAWINGS

The present invention will be described in greater detail below with reference to the drawings. In the drawings.

DETAILED DESCRIPTION OF THE INVENTION

Figure 1:
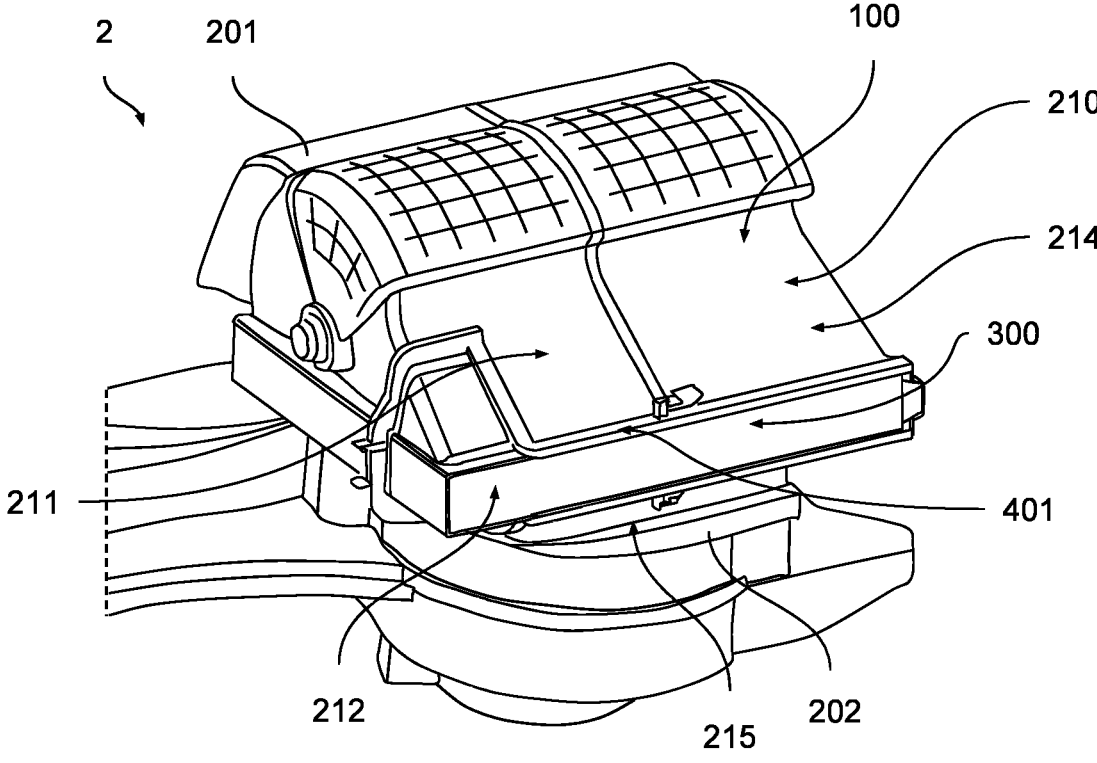
FIG. 1 shows a perspective view of the housing assembly according to the invention from above.
Figure 2:
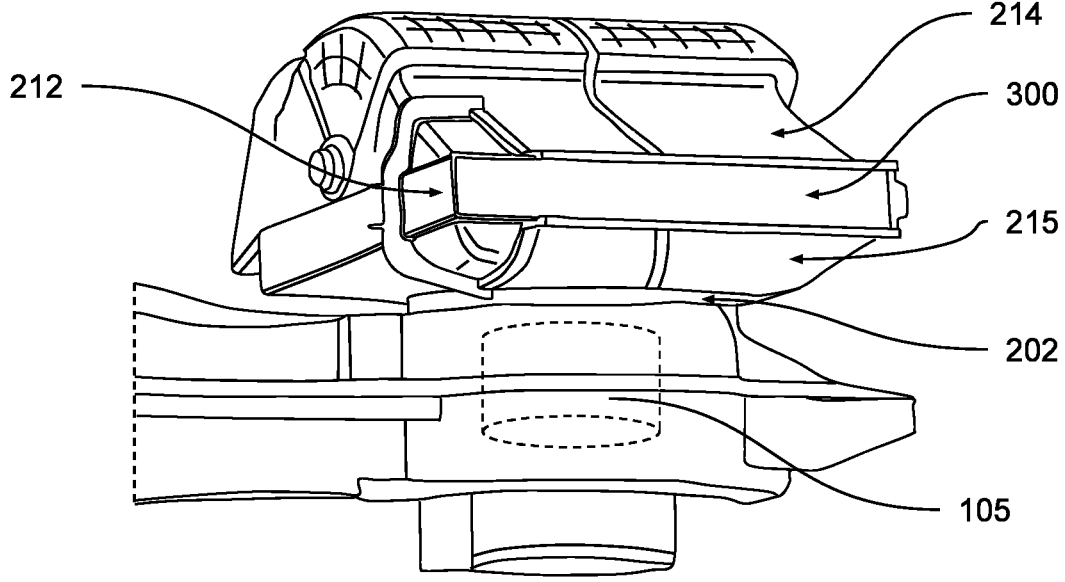
FIG. 2 shows a perspective view of the housing assembly of FIG. 1 from below.
Figure 3:
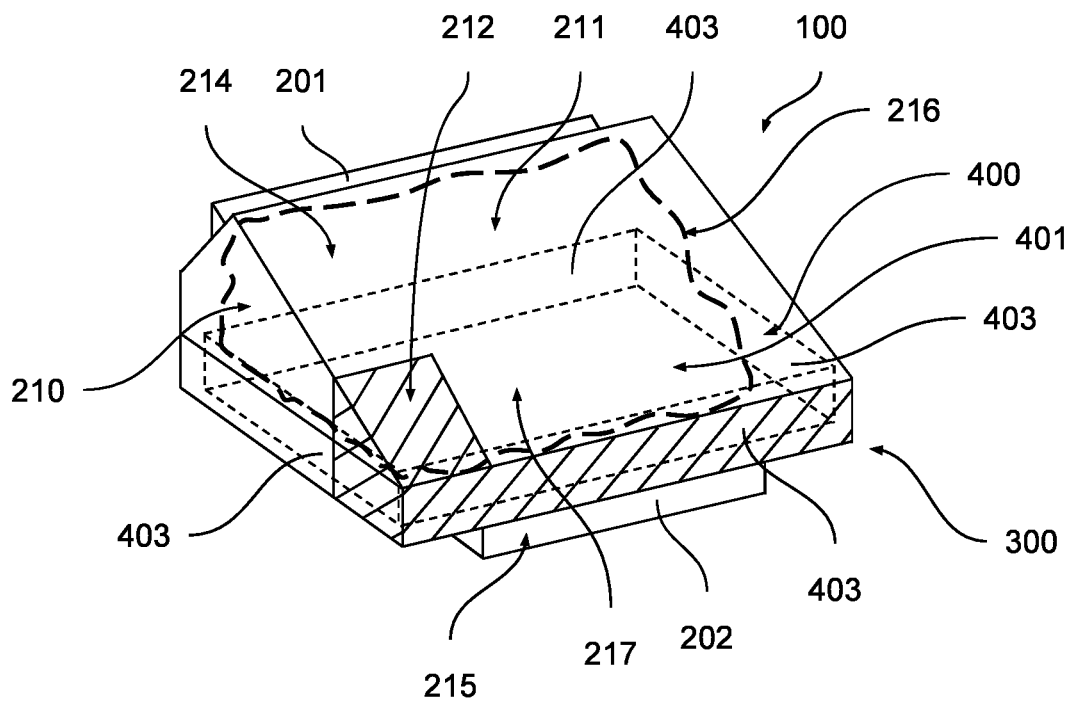
FIG. 3 shows elements of the housing assembly in a schematic way.

FIG. 1 shows a perspective view of the housing assembly 2 according to the invention from above with a removable cover 300 in place, while FIG. 2 shows a perspective view of the housing assembly 2 of FIG. 1 from below, with FIG. 3 depicting elements of the housing assembly 2 in a schematic way.

Figure 20:
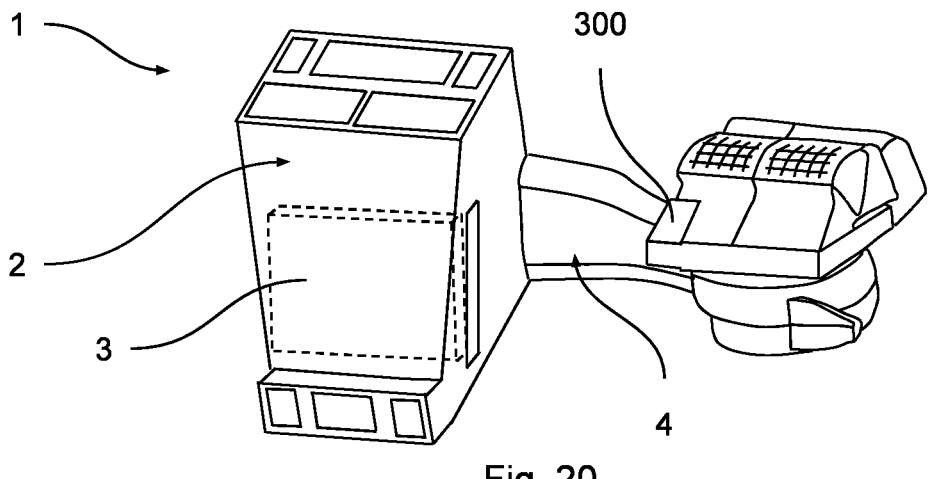
FIG. 20 shows schematically an HVAC system with a heat exchanger fully within the HVAC system.
Figure 21:
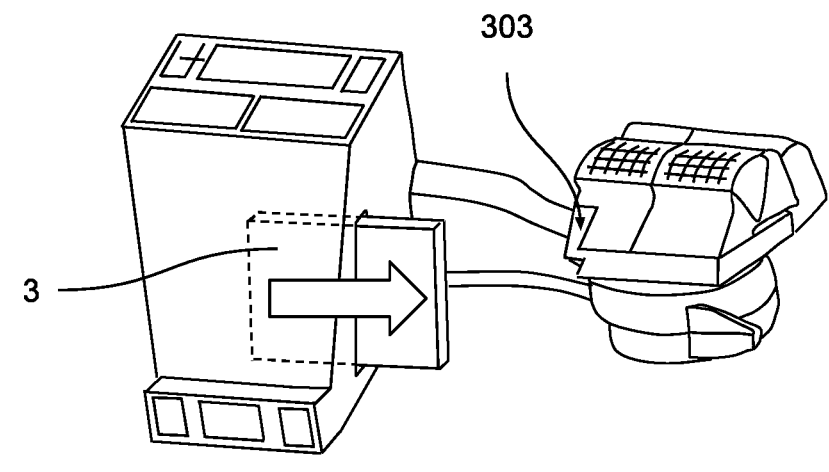
FIG. 21 shows schematically an HVAC system with a heat exchanger partially removed from the HVAC system.
Figure 22:
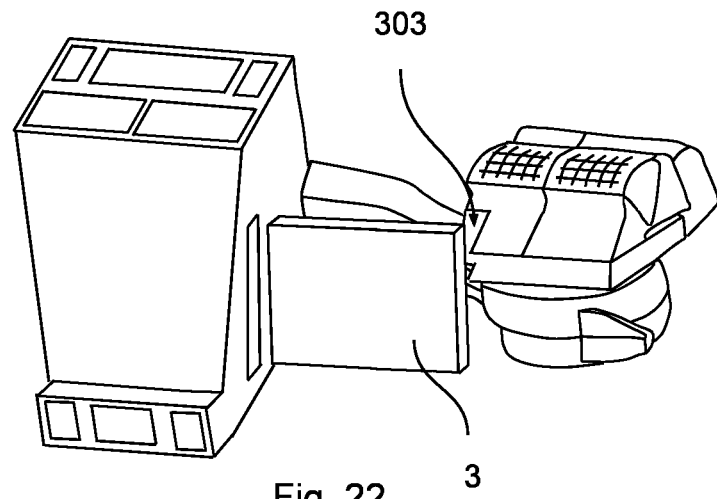
FIG. 22 shows schematically an HVAC system with a heat exchanger fully removed from the HVAC system.

The housing assembly 2 can be used in and be part of an HVAC system 1 as shown in FIGS. 20-22. The housing assembly 2 includes a casing 100. The casing 100 has an air inlet 201 and an air outlet 202. The air inlet 201 can be communicated with the outside of the HVAC system 1, for example with the outside of a vehicle including the HVAC system 1. The air outlet 202 can be communicated with further components and conduits downstream of the casing 100, for example with any heat exchanger 3 present in the HVAC system 1. The casing 100 participates in formation of an air conduit 210 for air travelling through the casing 100. In particular, the casing 100 forms a first portion 211 of an air conduit 210 between the air inlet 201 and the air outlet 202, the air conduit 210 being configured to guide airflow between the air inlet 201 and the air outlet 202. The casing 100 can include a blower 105 for propelling the air between the the air inlet 201 and the air outlet 202.

A second portion 212 of the air conduit 210 is formed by a removable cover 300, attached to the casing 100. In FIGS.

1-3, the removable cover 300 is in its place, i.e. it is not removed and not disconnected form the housing assembly 2

Figure 4:
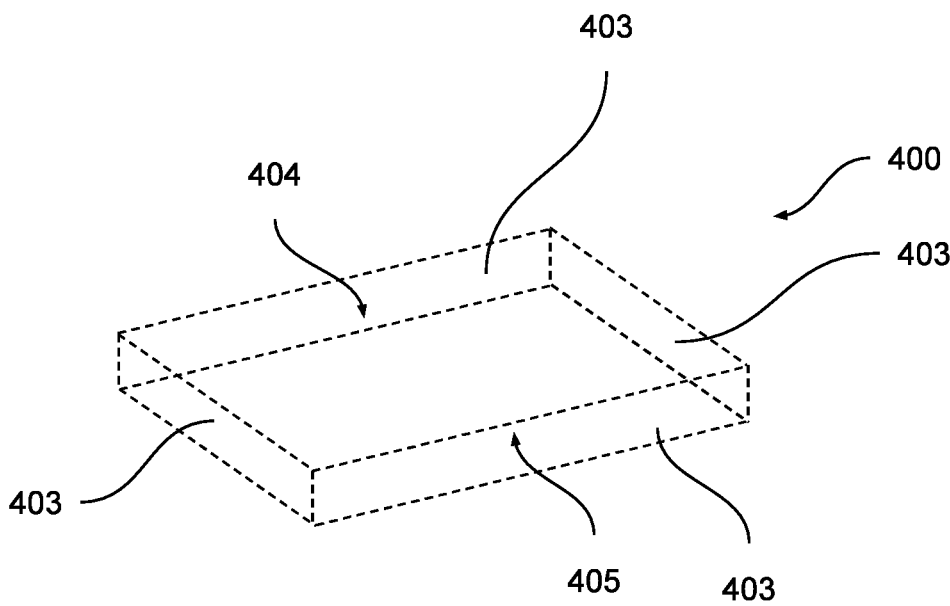
FIG. 4 shows schematically a filter slot of the housing assembly.
Figure 12:
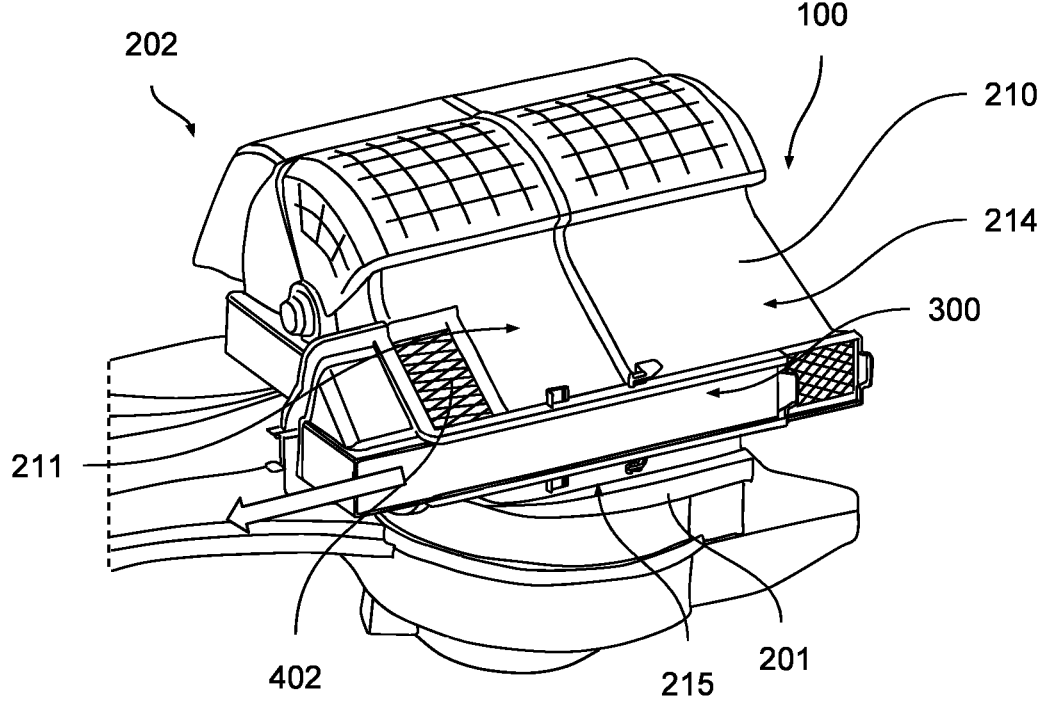
FIG. 12 shows a perspective view of the housing assembly according to the invention from above with a removable cover partially removed.
Figure 13:
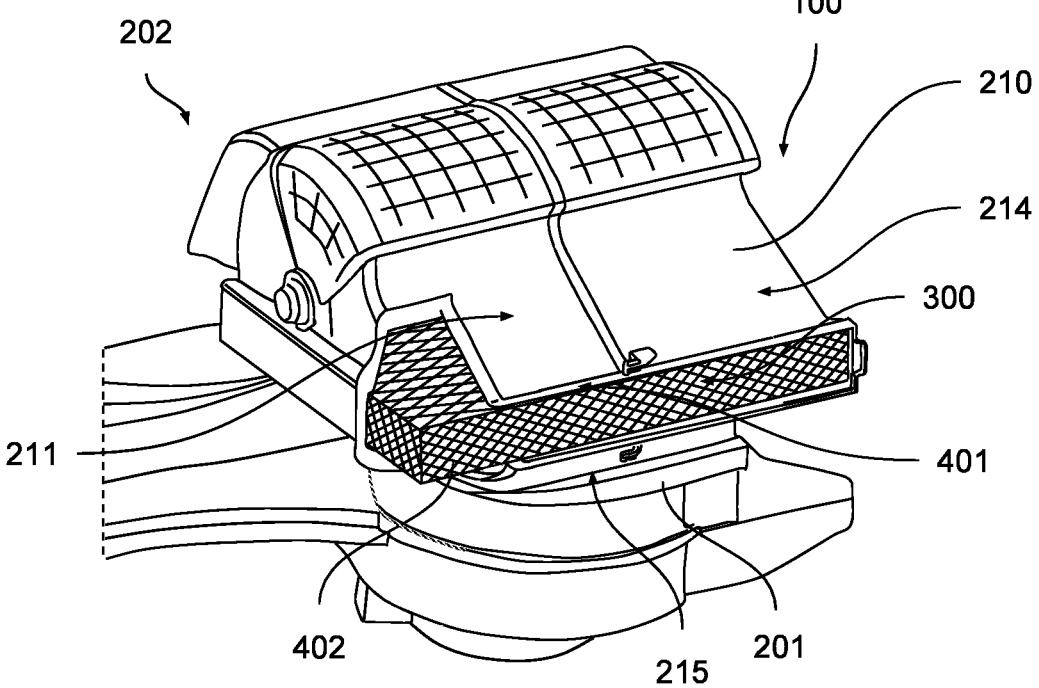
FIG. 13 shows a perspective view of the housing assembly according to the invention from above with a removable cover fully removed.

The casing 100 and the removable cover 300 together form a filter slot 400. The filter slot 400 can have a cuboid filter volume 401 (shown schematically in FIG. 4), configured to receive a filter 402 (as shown in FIGS. 12 and 13). The filter 402 can have a shape that is generally complementary to the filter slot 400, for example it can have a generally cuboid shape. This can aid fitting and retention of the filter 402 within the filter slot 400. Additionally, such complementary shape can allow filtration of all the air travelling between the air inlet 201 and the air outlet 202, i.e. the air traversing the air conduit 210.

The filter slot 400 includes sidewalls 403 for constraining the filter 402. For example, four sidewalls 403 can be dedicated to the sides of the filter 402, which can serve as structural elements of the filter 402 that do not directly participate to the filtration of air. The filter slot 400 has an inlet aperture 404 and an outlet aperture 405 for allowing the airflow between the air inlet 201 and the air outlet 202.

The air conduit 210 further includes a guidance wall 216 neighboring at least one of the filter slot sidewalls 403. By a guidance wall 216 is it meant here a part of the casing 100 forming the air conduit 210 that directs, or guides, the air within the air conduit 210 on its way between the air inlet 201 and the air outlet 202. The guiding function in particular relates to feeding the air into the filter 402 and/or evacuating the air from the filter 402.

While the casing 100 forms the first portion 211 of the air conduit 210, the second portion 212 thereof is formed by the removable cover 300. The second portion 212 includes a part of the guidance wall 216. In other words, the removable cover 300 is not limited to sidewalls 403 of the filter slot 400, but also includes portions of the housing assembly 2 preceding and/or succeeding the filter slot 400 (the filter 402). Thanks to this, when the removable cover 300 is removed, a larger portion of the volume occupied by the housing assembly 2 is freed. As will be explained later, such aspect can be advantageous for a housing assembly 2 of the HVAC system 1 in terms of serviceability needs.

The air conduit 210 includes a pre-filter section 214 defined between the air inlet 201 and the filter slot 400 and a post-filter section 215 defined between the filter slot 400 and the air outlet 202. The guidance wall 216 can be constituted by the pre-filter section 214.

The second portion 212 of the air conduit 210 can include at least partially two adjacent sidewalls 403 of the filter slot 400. In one option, the second portion 212 of the air conduit 210 can include one full sidewall 403 of the filter slot 400 and a portion of another, adjacent sidewall 403 of the filter slot 400.

Different configurations of sidewalls included in the second portion 212 can help with addressing servicing needs of the housing assembly 2.

Figures 5, 6, 7:
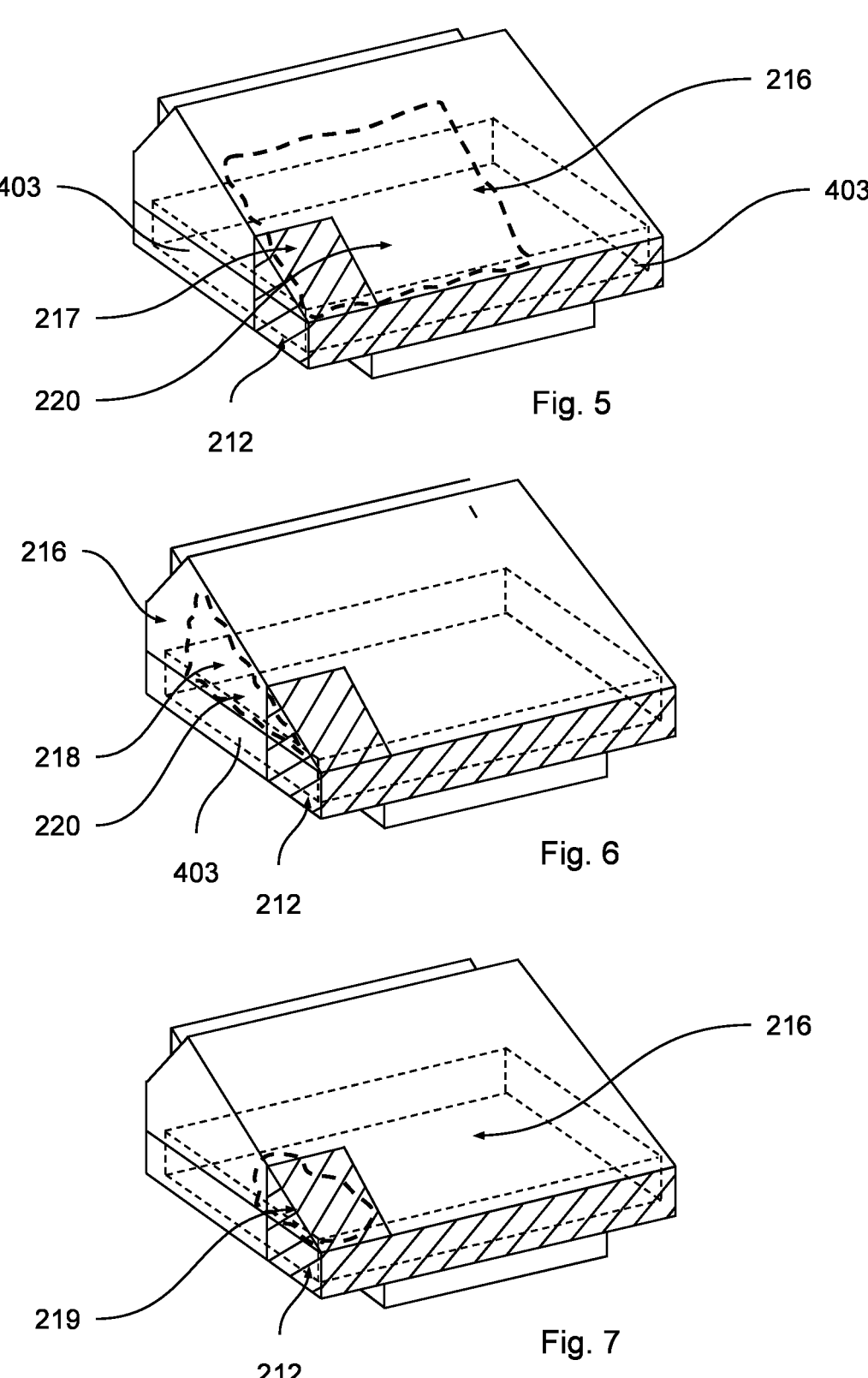
FIG. 5 shows certain elements of the housing assembly in a schematic way in a perspective view from above.
FIG. 6 shows certain elements of the housing assembly in a schematic way in a perspective view from above.
FIG. 7 shows certain elements of the housing assembly in a schematic way in a perspective view from above.

FIGS. 5-7 show certain elements of the housing assembly 2 in a schematic way in a perspective view from above.

In FIG. 5, the part of the guidance wall 216 included in the second portion 212 has an oblique section 217 extending towards and terminating in an oblique manner in a sidewall 403 of the filter slot 400. In this case, the part of the guidance wall 216 included in the second portion 212 forms a side section 220 terminating in a single sidewall 403 of the filter slot 400.

In FIG. 6 the part of the guidance wall 216 included in the second portion 212 has a parallel section 218 extending towards and terminating in parallel manner in a sidewall 403 of the filter slot 400. In this case, the part of the guidance wall 216 included in the second portion 212 forms a side section 220 terminating in a single sidewall 403 of the filter slot 400.

In FIG. 7, the part of the guidance wall 216 included in the second portion 212 forms a corner section 219 terminating in two adjacent sidewalls 403 of the filter slot 400. In this case, the second portion 212 as an oblique section 217 and a parallel section 218. In another example, not shown here, the second portion 212 have a corner section 219 with two oblique sections 217 or two parallel sections 218.

FIGS. 8-11 shows certain elements of the housing assembly in a schematic way in a perspective view from below.

In one option, the air conduit 210 includes a pre-filter section 214 defined between the air inlet 201 and the filter slot 400 and a post-filter section 215 defined between the filter slot 400 and the air outlet 202, wherein the guidance wall 216 is constituted by the post-filter section 215.

Figures 8, 9, 10, 11:
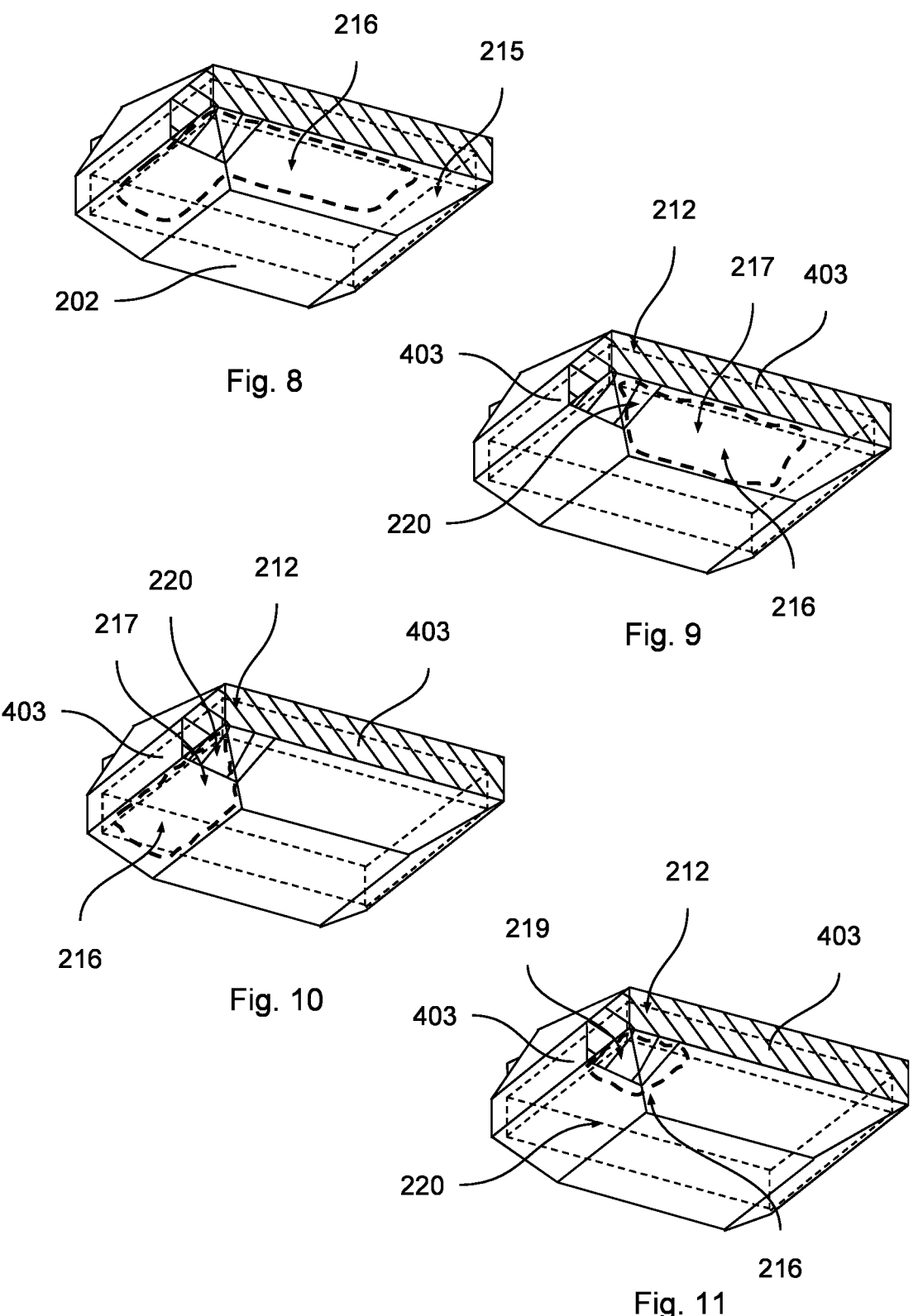
FIG. 8 shows certain elements of the housing assembly in a schematic way in a perspective view from below.
FIG. 9 shows certain elements of the housing assembly in a schematic way in a perspective view from below.
FIG. 10 shows certain elements of the housing assembly in a schematic way in a perspective view from below.
FIG. 11 shows certain elements of the housing assembly in a schematic way in a perspective view from below.

In FIG. 9, the part of the guidance wall 216 included in the second portion 212 forms a side section 220 terminating in a single sidewall 403 of the filter slot 400. The part of the guidance wall 216 included in the second portion 212 has an oblique section 217 extending towards and terminating in an oblique manner in a sidewall 403 of the filter slot 400.

In FIG. 10, the part of the guidance wall 216 included in the second portion 212 forms a side section 220 terminating in a single sidewall 403 of the filter slot 400. As shown, the part of the guidance wall 216 included in the second portion 212 can have an oblique section 217 extending towards and terminating in parallel manner in a sidewall 403 of the filter slot 400. In this case, the part of the guidance wall 216 included in the second portion 212 forms a side section 220 terminating in a single sidewall 403 of the filter slot 400. Here, the second portion 212 includes only a fragment of the sidewall 403 of the filter slot 400, i.e. there is a part of the same sidewall 403 that is not included in the second portion 212.

In FIG. 11, the guidance wall 216 included in the second portion 212 forms a corner section 219 terminating in two adjacent sidewalls 403 of the filter slot 400. In this case, both portions of guidance wall 216 constituting the corner section 219 are oblique with respect to the sidewalls 403, but in another example one could be oblique while the other could be parallel thereto.

FIG. 12 shows a perspective view of the housing assembly 2 according to the invention from above with a removable cover 300 partially removed, while in FIG. 13 the removable cover 300 is removed fully. Removal of the removable cover 300 exposes a cuboid filter 402 placed in the filter slot 400. The housing assembly 2 can be configured to enable sliding of the removable cover 300 along one of the sidewalls 403.

Figure 14:
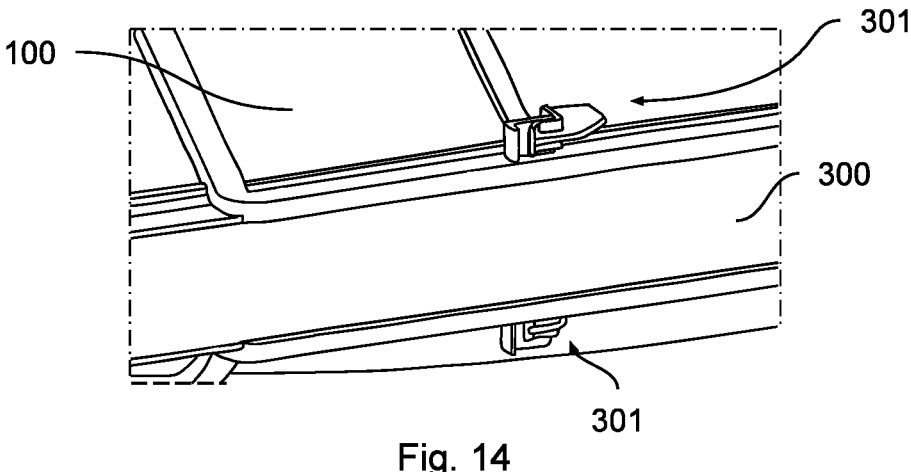
FIG. 14 shows a closer view of first attachment elements of the removable cover.

FIG. 14 shows a closer view of first attachment elements 301 of the removable cover 300. The first attachment elements 301 can be configured to provide a releasable, mechanical connection between the removable cover 300 and the casing 100. In one example, the first attachment elements 301 are in form of a latching assembly.

Figure 15:
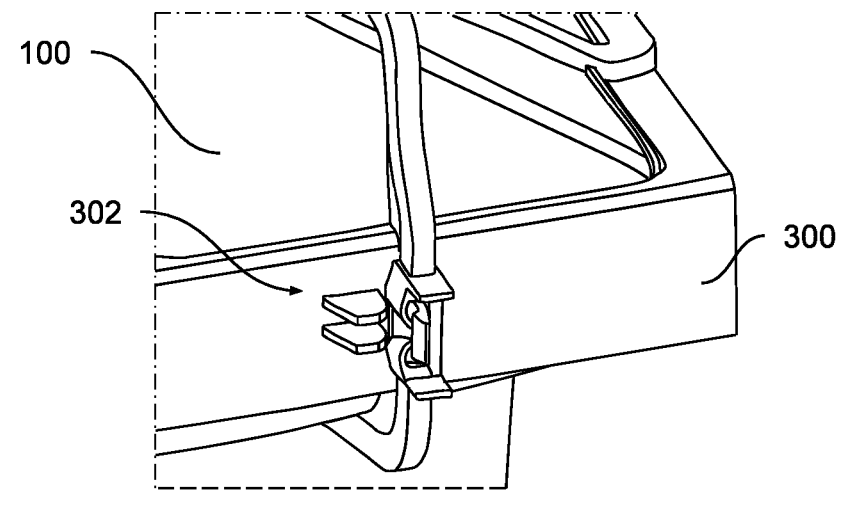
FIG. 15 shows a closer view of second attachment element of the removable cover.

FIG. 15 shows a closer view of second attachment element 302 of the removable cover 300. The second attachment elements 302 can be configured to provide a releasable, mechanical connection between the removable cover 300 and the casing 100. In one example, the second attachment elements 302 are in form of a latching assembly.

Figure 16:
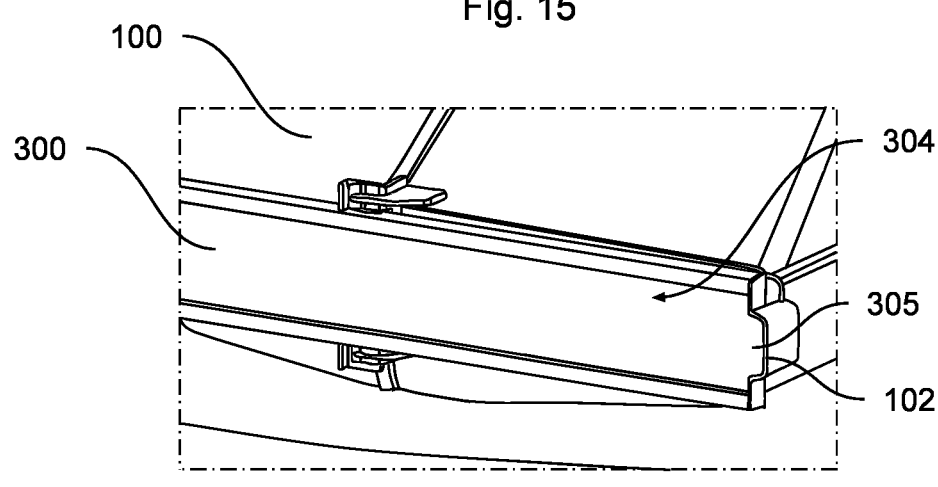
FIG. 16 shows a closer view of one of removable cover end sections.

FIG. 16 shows a closer view of one of cover end sections 304. In this example, the end section 304 is shaped to as to ensure proper positioning of the removable cover 300 during assembly within the casing 100. The removable cover 300 can have a cover protrusion 305, extending from the cover end section 304 parallel to a general extension direction of the removable cover 300. The casing 100 can have a respective crevice 102 for accepting the cover protrusion 305 and providing a shape connection restricting at least partly movement of the removable cover 300 with respect to the casing 100.

Figure 17:
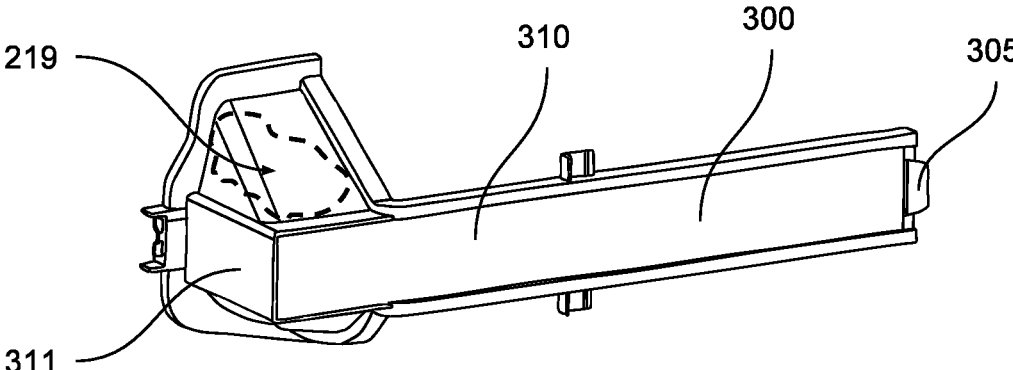
FIG. 17 shows a front perspective view of the removable cover from above.
Figure 18:
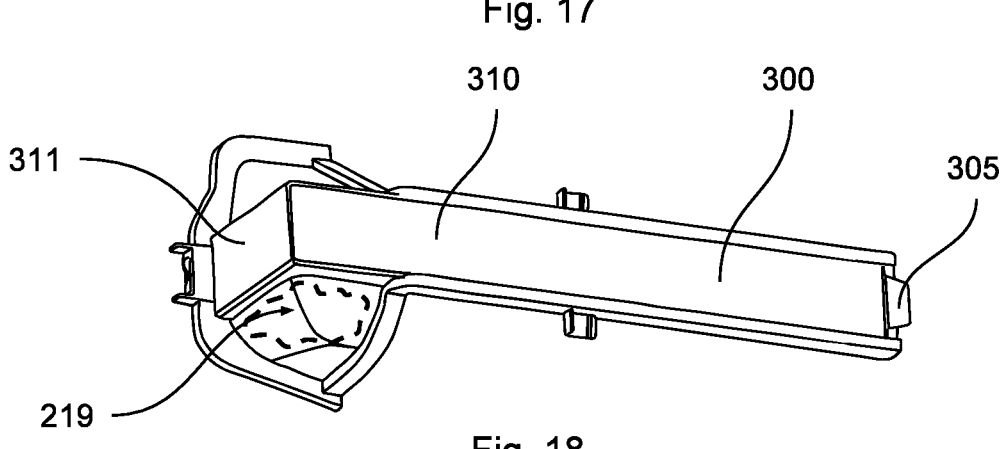
FIG. 18 shows a front perspective view of the removable cover from below.
Figure 19:
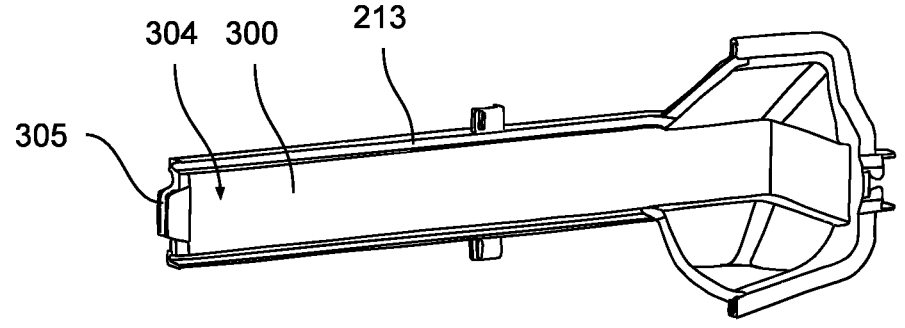
FIG. 19 shows a rear perspective view of the removable cover.

FIG. 17 shows a front perspective view of the removable cover 300 from above, while FIG. 18 shows a front perspective view of the removable cover 300 from below, with FIG. 19 showing a rear perspective view of the removable cover 300. As shown in FIGS. 17 and 18, the removable cover 300, constituting the second portion 212, can include two corner sections 219 (corresponding to both the pre-filer section 214 and post-filter section 215).

The removable cover 300 includes a first slot wall 310 and a second slot wall 311. The first slot wall 310 and the second slot wall 311 can be generally flat and rectangular. The first slot wall 310 and the second slot wall 311 can be arranged perpendicularly with respect to each other. In the shown example, the first slot wall 310 is dimensioned to cover a full sidewall 403 of the filer slot 400, while the second slot wall 311 is dimensioned to cover only a part of a sidewall 403 of the filter slot 400. If needed, the first and/or second slot walls 310, 311 could be alternatively dimensioned, depending on specific requirements for packaging to be freed upon removal of the removable cover 300.

Generally, the removable cover 300, constituting the second portion 212 of the air conduit 210, is intended to be connected with the first portion 211 of the air conduit 210, constituted by the casing 100. In one example, one of the first and second portions 211, 212 includes a groove 213 for receiving the other from the first and second portions 211, 212. For example, as shown in FIG. 19, the second portion 212 of the air conduit 210 includes the groove 213 for receiving the first portion 211 of the air conduit 210, i.e. a corresponding edge of the casing 100. As the groove 213 is open at its end near the end section 304 of the removable cover 300, the cooperating portion of the casing 100 can be slid into the grove 213 during the mounting of the removable cover 300.

FIG. 20 shows schematically an HVAC system 1 with a heat exchanger 3 fully within the HVAC system 1. In general, the HVAC systems 1 can include a heat exchanger 3 removable from the HVAC system 1, such as a heater core which can require being replaced in case of malfunction. The housing assembly 2 can be configured to enable movement of the heat exchanger 3 towards removable cover location 303 during the heat exchanger 3 removal.

FIG. 21 shows schematically an HVAC system 1 with a heat exchanger 3 partially removed from the HVAC system 1. The heat exchanger 3 can be moved in the direction of the removable cover location 303, normally occupied by the removable cover 300.

It is to be noted that the removable cover 300 can be removed by sliding it substantially in the opposite direction to the direction of removal of the heat exchanger 3. In other words, the same space between the heat exchanger 3 and the filter 402, here referenced as a servicing space 4, is used for movement and eventual removal (or insertion) of those components.

FIG. 22 shows schematically an HVAC system 1 with a heat exchanger 3 fully removed from the HVAC system 1. The dimensioning of the HVAC system 1, of its housing assembly 2 and the casing 100, can be so adjusted as to accommodate the removal of the heat exchanger 3 only after removal of the removable cover 300. In other words, with the removable cover 300 in place, it cannot be possible to remove the heat exchanger 3 from the housing assembly 2, or at least it can be very cumbersome. Due to this, the overall packaging of the system can be minimized while maintaining serviceability of the heat exchanger 3.

Other variations to the disclosed embodiments can be understood and effected by those skilled in the art in practicing the claimed invention, from a study of drawings, the disclosure, and the appended claims. The mere fact that certain measures are recited in mutually different dependent claims does not indicate that a combination of these measures cannot be used to the advantage.

The invention claimed is:

1. A housing assembly for an HVAC system, comprising:
a casing with an air inlet and an air outlet, forming a first portion of an air conduit between the air inlet and the air outlet, the air conduit being configured to guide airflow between the air inlet and the air outlet;
a removable cover, attached to the casing and forming a second portion of the air conduit;
wherein the casing and the removable cover form a continuous filter slot with a cuboid filter volume, configured to receive a generally cuboid filter of complementary shape for filtrating the air traversing the air conduit, the filter slot including four sidewalls for constraining the filter, an inlet aperture and an outlet aperture for allowing the airflow between the air inlet and the air outlet,
wherein the air conduit includes an uninterrupted guidance wall neighboring at least one of the filter slot sidewalls, the second portion of the air conduit including a part of the guidance wall;
wherein part of the uninterrupted guidance wall forms a side section terminating in a sidewall of the filter slot.

2. The housing assembly according to claim 1, wherein the air conduit includes a pre-filter section defined between the air inlet and the filter slot and a post-filter section defined between the filter slot and the air outlet, wherein the guidance wall is part of the pre-filter section.

3. The housing assembly according to claim 1, wherein the part of the guidance wall included in the second portion has an oblique section extending towards and terminating in an oblique manner in a sidewall of the filter slot.

4. The housing assembly according to claim 1, wherein the part of the guidance wall included in the second portion has a parallel section extending towards and terminating in parallel manner in a sidewall of the filter slot.

5. The housing assembly according to claim 1, wherein the air conduit includes a pre-filter section defined between the air inlet and the filter slot and a post-filter section defined between the filter slot and the air outlet, wherein the guidance wall is part of the post-filter section.

6. The housing assembly according to claim 1, wherein the part of the guidance wall included in the second portion forms a corner section terminating in two adjacent sidewalls of the filter slot.

7. The housing assembly according to claim 1, wherein the second portion of the air conduit includes at least partially two adjacent sidewalls of the filter slot.

8. The housing assembly according to claim 7, wherein the second portion of the air conduit includes one full sidewall of the filter slot and a portion of another, adjacent sidewall of the filter slot.

9. The housing assembly according to claim 1, further comprising a cuboid filter placed in the filter slot.

10. The housing assembly according to claim 1, wherein the second portion of the air conduit is connected with the first portion of the air conduit, wherein one of the first and second portions includes a groove for receiving the other from the first and second portions.

11. The housing assembly according to claim 1, wherein the second portion of the air conduit is connected with the first portion of the air conduit, wherein the second portion of the air conduit includes a groove for receiving the first portion of the air conduit.

12. The housing assembly according to claim 11, wherein the second portion of the air conduit is adapted to be slid with respect to the first portion of the air conduit along a sidewall of the filter slot.

13. An HVAC system, comprising a housing assembly including:
a casing with an air inlet and an air outlet, forming a first portion of an air conduit between the air inlet and the air outlet, the air conduit being configured to guide airflow between the air inlet and the air outlet;
a removable cover, attached to the casing at a removable cover location and forming a second portion of the air conduit;
wherein the casing and the removable cover form a filter slot with a cuboid filter volume,
configured to receive a generally cuboid filter of complementary shape for filtrating the air traversing the air conduit, the filter slot including four sidewalls for constraining the filter, an inlet aperture and an outlet aperture for allowing the airflow between the air inlet and the air outlet,
wherein the air conduit includes a guidance wall neighboring at least one of the filter slot sidewalls, the second portion of the air conduit including a part of the guidance wall; a heat exchanger removable from the HVAC system;
wherein part of the guidance wall forms a side section terminating in a sidewall of the filter slot; and
wherein the housing assembly is configured to enable movement of the heat exchanger towards the removable cover location during the heat exchanger removal.

14. The HVAC system according to claim 13, wherein the housing assembly is dimensioned to enable removal of the heat exchanger when the removable cover is removed and prevent removal of the heat exchanger when the removable cover is in place.

15. The HVAC system according to claim 13, wherein the housing assembly includes a servicing opening for the heat exchanger, wherein the housing assembly forms a servicing space between the servicing opening and the filter slot, the heat exchanger and the removable cover being able to move into the servicing space upon detachment from the housing assembly.

16. An HVAC system, comprising a housing assembly including:
a casing with an air inlet and an air outlet, forming a first portion of an air conduit between the air inlet and the air outlet, the air conduit being configured to guide airflow between the air inlet and the air outlet;
a removable cover, attached to the casing and forming a second portion of the air conduit;
wherein the casing and the removable cover form a filter slot with a cuboid filter volume, configured to receive a generally cuboid filter of complementary shape for filtrating the air traversing the air conduit, the filter slot including four sidewalls for constraining the filter, an inlet aperture and an outlet aperture for allowing the airflow between the air inlet and the air outlet, wherein the air conduit includes an uninterrupted guidance wall neighboring at least one of the filter slot sidewalls, the second portion of the air conduit including a part of the guidance wall.

17. The HVAC system according to claim 16, wherein part of the guidance wall forms a side section terminating in a sidewall of the filter slot.

18. The HVAC system according to claim 16, wherein part of the guidance wall forms a corner section terminating in two adjacent sidewalls of the filter slot.

19. The HVAC system according to claim 16, wherein the housing assembly includes a heat exchanger removable from the HVAC system and is dimensioned to enable removal of the heat exchanger when the removable cover is removed and prevent removal of a heat exchanger when the removable cover is in place.

\* \* \* \* \*